United States Patent
Na et al.

(10) Patent No.: US 12,259,894 B2
(45) Date of Patent: Mar. 25, 2025

(54) ACCOUNTING FOR ITEM ATTRIBUTES WHEN SELECTING ITEMS SATISFYING A QUERY BASED ON ITEM EMBEDDINGS AND AN EMBEDDING FOR THE QUERY

(71) Applicant: Maplebear Inc., San Francisco, CA (US)

(72) Inventors: Taesik Na, Issaquah, WA (US); Zhihong Xu, Sunnyvale, CA (US); Guanghua Shu, Sunnyvale, CA (US); Tejaswi Tenneti, Fremont, CA (US); Haixun Wang, Palo Alto, CA (US)

(73) Assignee: Maplebear Inc., San Francisco, CA (US)

(*) Notice: Subject to any disclaimer, the term of this patent is extended or adjusted under 35 U.S.C. 154(b) by 146 days.

(21) Appl. No.: 17/666,531

(22) Filed: Feb. 7, 2022

(65) Prior Publication Data
US 2023/0252032 A1    Aug. 10, 2023

(51) Int. Cl.
*G06F 16/2457* (2019.01)
*G06F 16/242* (2019.01)

(52) U.S. Cl.
CPC .... *G06F 16/24578* (2019.01); *G06F 16/2438* (2019.01)

(58) Field of Classification Search
CPC .............. G06F 16/2438; G06F 16/24578
USPC ........................................................ 707/769
See application file for complete search history.

(56) References Cited

U.S. PATENT DOCUMENTS

| | | | |
|---|---|---|---|
| 10,902,009 B1* | 1/2021 | Lenz, Jr. | G06F 16/9535 |
| 2005/0234972 A1 | 10/2005 | Zeng et al. | |
| 2009/0112593 A1* | 4/2009 | Konig | G06F 16/2423 704/251 |
| 2011/0191374 A1* | 8/2011 | Bengio | G06F 16/50 707/E17.014 |
| 2016/0055563 A1 | 2/2016 | Grandhi | |
| 2018/0096071 A1* | 4/2018 | Green | G06F 16/248 |
| 2018/0349492 A1* | 12/2018 | Levy | G06F 16/639 |
| 2019/0311375 A1 | 10/2019 | Sapoznik et al. | |
| 2021/0133596 A1* | 5/2021 | Canim | G06N 5/022 |

(Continued)

OTHER PUBLICATIONS

Bordawekar, R. et al. "Using Word Embedding to Enable Semantic Queries in Relational Databases," *Workshop on Data Management for End-To-End Machine Learning*, May 14, 2017, pp. 1-4.

(Continued)

*Primary Examiner* — Kimberly L Wilson
(74) *Attorney, Agent, or Firm* — Fenwick & West LLP

(57) ABSTRACT

An online system maintains various items and maintains values for different attributes of the items, as well as an item embedding for each item. When the online system receives a query for retrieving one or more items, the online system generates an embedding for the query. Based on measures of similarity between the embedding for the query and item embeddings, the online system selects a set of items. The online system identifies a specific attribute of items and generates a whitelist of values for the specific attribute based on measures of similarity between item embeddings for items in the selected set and the embedding for the query. The online system removes items having values for the selected attribute outside of the whitelist of values from the selected set of items to identify items more likely to be relevant to the query.

20 Claims, 7 Drawing Sheets

(56) References Cited

U.S. PATENT DOCUMENTS

| | | | |
|---|---|---|---|
| 2022/0245706 A1* | 8/2022 | Chaidaroon | G06F 16/9535 |
| 2023/0080205 A1* | 3/2023 | Singh | G06V 20/68 |
| | | | 705/28 |

OTHER PUBLICATIONS

Jbene, M. et al. "Deep Neural Network and Boosting Based Hybrid Quality Ranking for e-Commerce Product Search," *Big Data and Cognitive Computing*, vol. 5, No. 3, Aug. 13, 2021, pp. 1-13.

Nigam, P. et al. "Semantic Product Search," *25th ACM SIGKDD International Conference on Knowledge Discovery & Data Mining*, Jul. 25, 2019, pp. 2876-2885.

* cited by examiner

ACCOUNTING FOR ITEM ATTRIBUTES WHEN SELECTING ITEMS SATISFYING A QUERY BASED ON ITEM EMBEDDINGS AND AN EMBEDDING FOR THE QUERY

BACKGROUND

This disclosure relates generally to retrieving items satisfying a retrieved query, and more specifically to using attributes of items to select items based on item embeddings of the items and an embedding for the query.

Many online systems, such as online concierge systems, receive queries from users and retrieve items matching or otherwise relevant to the query. For example, an online concierge system receives a query from a user and retrieves items offered by one or more warehouses that satisfy the query. Commonly, online systems compare text information describing items to a received query and retrieve items with text description matching at least a part of the query.

However, such matching of text descriptions with queries may fail to identify certain items or identify items that are less relevant to a user's intent for providing a query. To retrieve items with higher relevance to a query, an online system may use embedding based retrieval to retrieve items. In embedding based retrieval, an online system generates an embedding for a query and generates embeddings for items accessed by, or maintained by, the online system. The embedding for the query represents the query as a multidimensional vector in a latent space, while embeddings for items similarly represent items as multidimensional vectors in the latent space. For a received query, the online system identifies items having embeddings nearest to the embedding for the query in the latent space to retrieve items for the query. When retrieving items using embedding based retrieval, the retrieved items may include items with embeddings that are near the embedding for the query in the latent space that are irrelevant to the received query. An online system including irrelevant items in the items displayed as results to the query may discourage further user interaction with the online system or prevent subsequent selection of items from the results for the query displayed to the user.

SUMMARY

An online system, such as an online concierge system, receives a query including one or more terms from a user. The online system generates an embedding for the query that comprises a multidimensional vector representing the query in a latent space. Additionally, the online system generates and maintains embeddings for items stored by or accessible by the online system. In an example where the online system is an online concierge system, the online concierge system maintains an item embedding for each item offered by a warehouse that communicates with the online concierge system. In another example where the online system provides content items to users, the online system maintains item embeddings for each content item maintained by the online system or accessible to the online system. Each item embedding is associated with an item identifier that uniquely identifies an item. An item embedding represents an item as a multidimensional vector in a latent space. In various embodiments, item embeddings and the embedding for the query have an equal number of dimensions.

The online system retrieves item embeddings and selects a set of items having item embeddings nearest to the embedding for the query in the latent space. In various embodiments, the online system determines distances between the embedding for the query and item embeddings and selects the set of items based on the determined distances. For example, the online system ranks items based on distances between corresponding item embeddings and the embedding for the query, with items corresponding to shorter distances having higher positions in the ranking, and selects the set of items as items having at least a threshold position in the ranking. Alternatively, the set of items includes items with item embeddings having less than a threshold distance to the embedding for the query. The online system may use any suitable nearest neighbor process or approximate nearest neighbor process to select the set of items in various embodiments.

In some embodiments, the online system determines distances between the embedding for the query and each item embedding. In other embodiments, the online system retrieves a group of item embeddings based on the received query and determines a distance between the embedding for the query and each item embedding of the group. For example, the online system maintains different groups of item embeddings, where each item embedding in a group has a common characteristic; the online system determines a characteristic of the query from metadata included in the query and selects a group with a common characteristic of item embeddings matching the characteristic of the query and determines distances between the embedding for the query and item embeddings of the group.

In other embodiments, the online system selects the set of items by determining a measure of similarity between the embedding for the query and an item embedding of an item. In some embodiments, the measure of similarity is a dot product of the embedding for the query and an item embedding of an item of the selected set. Alternatively, the measure of similarity is a cosine similarity between the embedding for the query and an item embedding of the item of the selected set. However, in other embodiments the online system may determine any suitable measure of similarity between the embedding for the query and an item embedding of an item of the selected set. In various embodiments, the online system ranks items based on the measure of similarity between item embeddings corresponding to the items and the embedding for the query and selects the set of items as items having at least a threshold position in the ranking. Alternatively, the online system selects the set of items as items with corresponding item embeddings having at least a threshold measure of similarity to the embedding for the query.

To remove items from the selected set that are less relevant to the received query, the online system identifies a specific attribute for each item of the selected set. The specific attribute may be predetermined by the online system in some embodiments. Alternatively, the specific attribute may be identified by a user from whom the query is received. For example, the online system is an online concierge system that stores a category (e.g., from a product catalog or hierarchical taxonomy of searchable items) in association with each item, along with other information, and the online concierge system identifies a category stored in association with each item having an item embedding included in the selected set. Each item of the selected set has a value associated with the specific attribute by the online system, and the online system retrieves a value of the specific attribute for each item of the selected set. Referring back to the previous example where the specific attribute is a category associated with an item, the online concierge system retrieves a value of the category for each item of the selected set.

From the values of the selected attribute for each item of the selected set and the measure of similarity between the embedding for the query and item embeddings corresponding to items included in the selected set, the online system generates a whitelist of values for the specific attribute from values of the specific attribute for items of the selected set. In one embodiment, the selected set of items is ranked based on a measure of similarity to the embeddings for the query, and the online system identifies items of the selected set having at least a threshold position in the ranking. The online system generates the whitelist of values as values of the selected attribute for the identified items. Alternatively, the online system identifies items in the selected set corresponding to item embeddings with having a threshold measure of similarity to the embedding for the query and generates the whitelist of values of the selected attribute as values of the selected attribute for the identified items. In other embodiments, the online system identifies items based on both a ranking of the items based on a ranking of the items based on measures of similarity between the embedding for the query and a threshold measure of similarity to the embedding for the query. For example, the online system identifies items having at least the threshold position in the ranking and having at least the threshold measure of similarity to the embedding for the query and generates the whitelist of values as values of the selected attribute for the identified items.

Using the whitelist of values of the selected attribute, the online system modifies the set of items by removing items that do not have a value of the selected attribute included in the whitelist of values. To modify the set of items, the online system retrieves a value for the specific attribute stored in association with each item of the selected set. In response to an item having a particular value for the specific attribute that is not included in the whitelist of values, the online system removes the item from the selected set of items. Hence, modifying the set of items results in items having values for the specific attribute matching at least one value in the whitelist of values and does not include items that have values for the specific attribute that do not match at least one value in the whitelist of values. As the whitelist of values was generated from items with item embeddings having higher measures of similarity to the embedding for the query, the whitelist of values includes values for the specific attribute for items more similar to the received query. Hence, removing items from the selected set with values for the specific attribute that are not included in the whitelist of values results in a modified set of items including items with values for the specific attribute that correspond to values for the specific attribute for items with item embeddings that are more similar to the embedding for the query.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
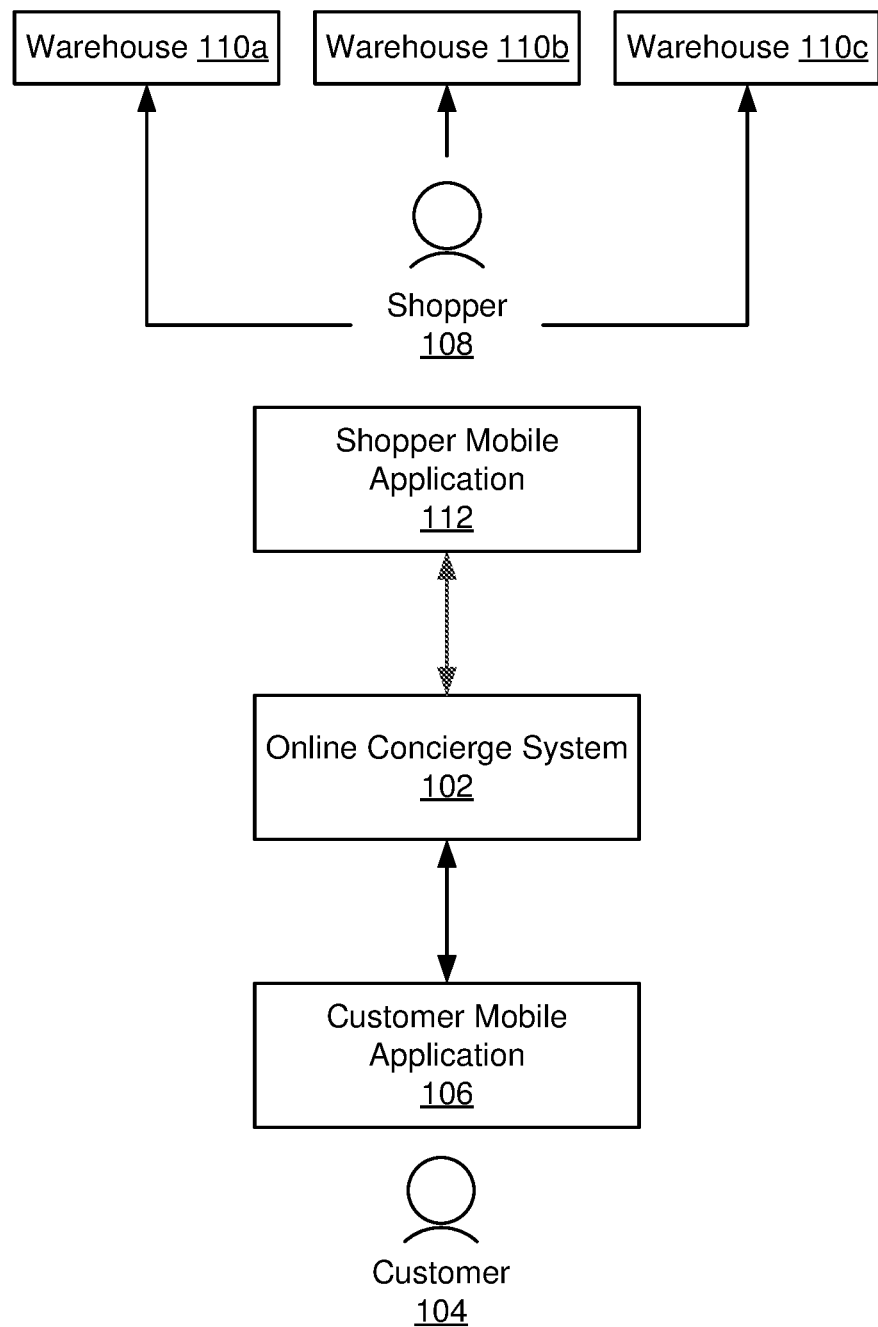
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
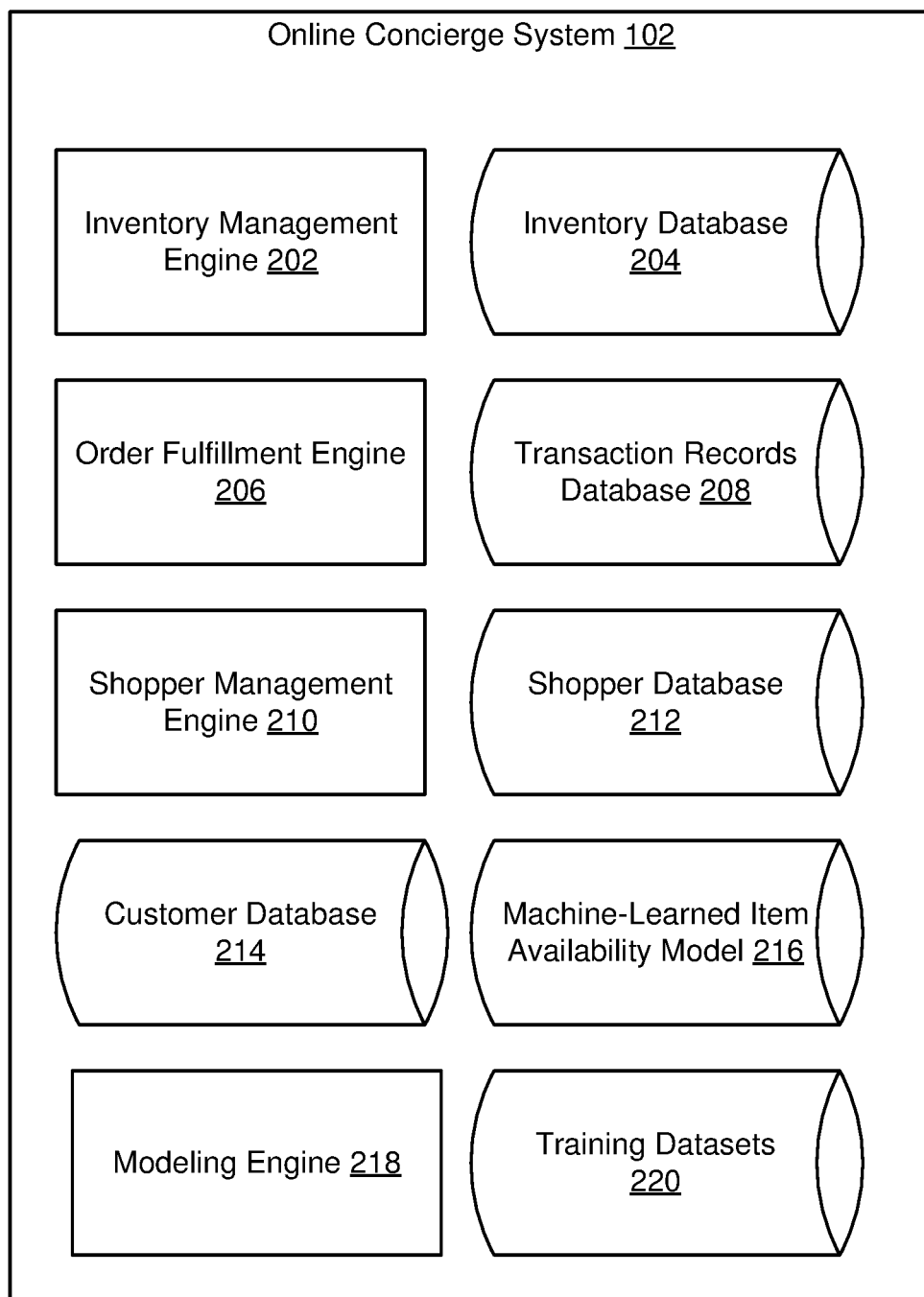
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes attributes of items that include both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

For each item, the inventory database 204 identifies one or more attributes of the item and corresponding values for each attribute of an item. For example, the inventory database 204 includes an entry for each item offered by a warehouse 110, with an entry for an item including an item identifier that uniquely identifies the item. The entry includes different fields, with each field corresponding to an attribute of the item. A field of an entry includes a value for the attribute corresponding to the attribute for the field, allowing the inventory database 204 to maintain values of different categories for various items. Additionally, an entry for an item includes an item embedding generated for the item, as further described below in conjunction with FIG. 5.

In various embodiments, the inventory management engine 202 maintains a taxonomy of items offered for purchase by one or more warehouses 110. For example, the inventory management engine 202 receives an item catalog from a warehouse 110 identifying items offered for purchase by the warehouse 110. From the item catalog, the inventory management engine 202 determines a taxonomy of items offered by the warehouse 110. Different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 110 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 110 in various embodiments. In other embodiments, the inventory management engine 202 applies a trained classification module to an item catalog received from a warehouse 110 to include different items in levels of the taxonomy, so application of the trained classification model associates specific items with categories corresponding to levels within the taxonomy.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In various embodiments, the order fulfillment engine 206 generates and transmits a search interface to a client device of a user for display via the customer mobile application 106. The order fulfillment engine 206 receives a query comprising one or more terms from a user and retrieves items satisfying the query, such as items having descriptive information matching at least a portion of the query. In various embodiments, the order fulfillment engine 206 leverages item embeddings for items to retrieve items based on a received query. For example, the order fulfillment engine 206 generates an embedding for a query and determines measures of similarity between the embedding for the query and item embeddings for various items included in the inventory database 204. As further described below in conjunction with FIG. 4, the order fulfillment engine 206 leverages values of one or more attributes of items along with measures of similarity between the embedding for the query and item embeddings to retrieve items with higher likelihoods of being relevant to the query. For example, the order fulfillment engine 206 identifies a specific attribute and determines values for the specific attribute for items having item embeddings with measures of similarity to the embedding for the query satisfying one or more criteria. The order fulfillment engine 206 disregards retrieved items for the query that have values for the specific attribute other than the determined values to increase likely relevance of the retrieved items to the query, as further described below in conjunction with FIG. 4.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse 110 to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 determines whether to delay display of a received order to shoppers for fulfillment by a time interval. In response to determining to delay the received order by a time interval, the order fulfilment engine 206 evaluates orders received after the received order and during the time interval for inclusion in one or more batches that also include the received order. After the time interval, the order fulfillment engine 206 displays the order to one or more shoppers via the shopper mobile application 112; if the order fulfillment engine 206 generated one or more batches including the received order and one or more orders received after the received order and during the time interval, the one or more batches are also displayed to one or more shoppers via the shopper mobile application 112.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g., if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times, and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
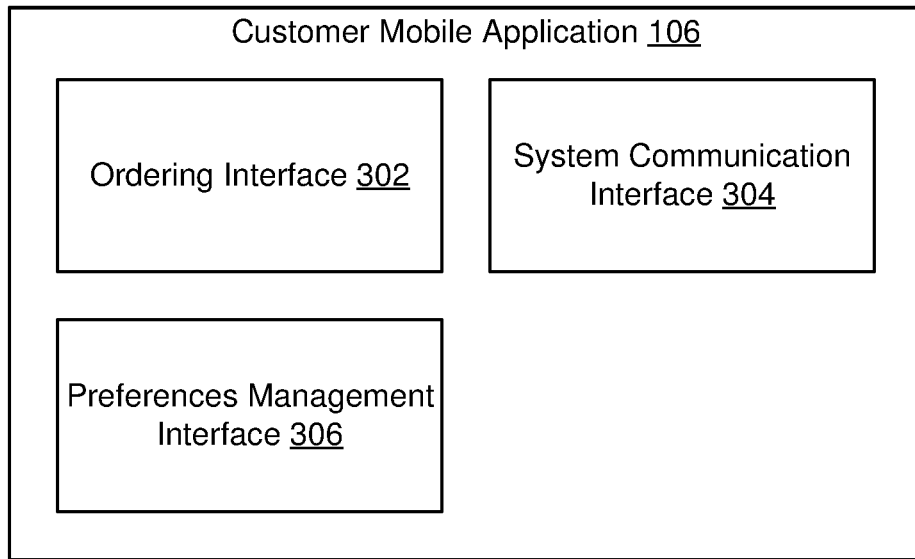
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
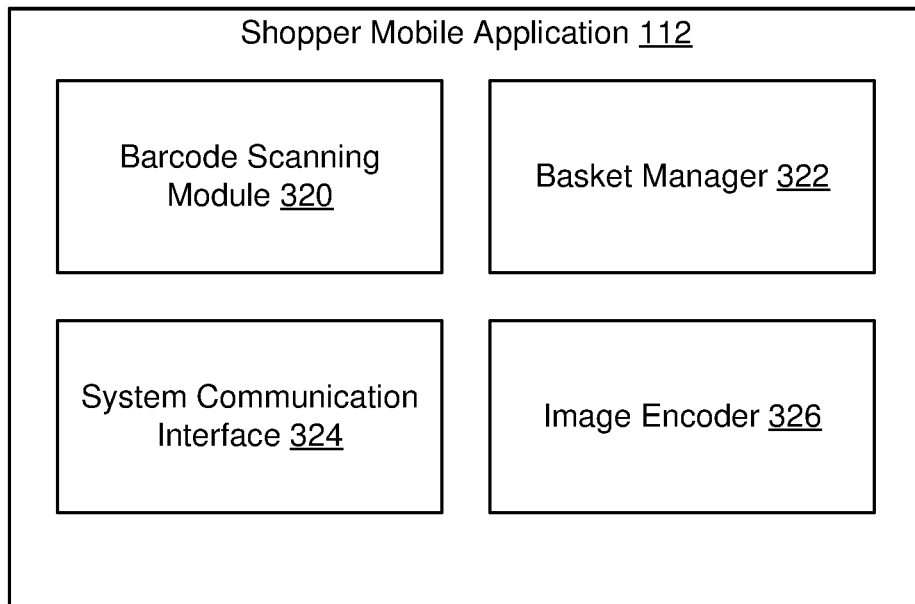
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Figure 4:
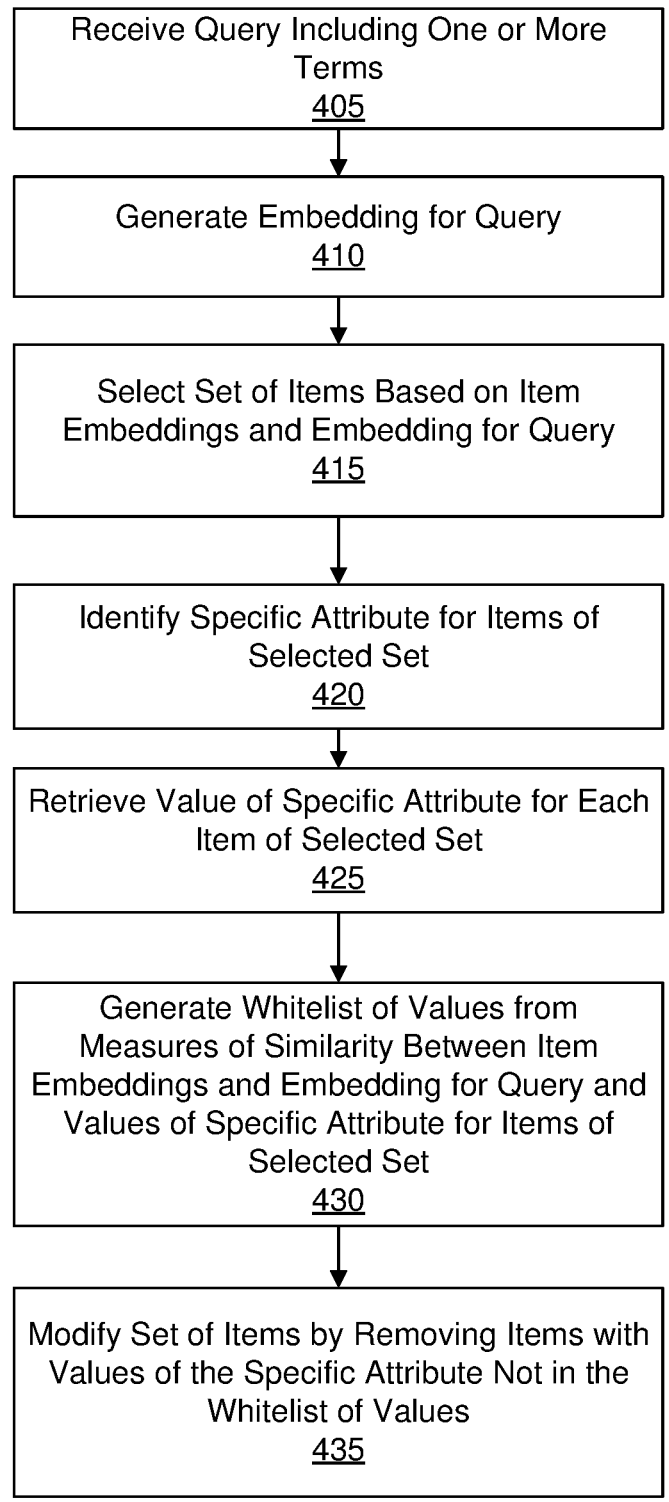
FIG. 4 is a flowchart of a method for retrieving items for a query using an embedding for the query, item embeddings, and one or more attributes of the items, according to one embodiment.

Complementing Embedding Based Retrieval of Items for a Query Using Attributes of the Items FIG. 4 is a flowchart of one embodiment of a method for retrieving items for a query using an embedding for the query, item embeddings, and one or more attributes of the items. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments, while in other embodiments, the steps of the method are performed by any online system capable of retrieving items.

An online system, such as the online concierge system 102 further described above in FIGS. 1 and 2 or other item search system, receives 405 a query including one or more terms from a user. For example, the online concierge system 102 receives a request to create an order from a user that identifies a warehouse 110 and receives the query including one or more terms to identify one or more items satisfying the query offered by the warehouse 110. The online system generates 410 an embedding for the query that comprises a multidimensional vector representing the query in a latent space. The online system may use any suitable method for generating an embedding for the query. Example methods for generating the embedding for the query include Word2Vec, GloVE, as a layer in a neural network trained from a training set of documents or other text data, or any other suitable method.

Additionally, the online system generates and maintains embeddings for items stored by or accessible by the online system. In an example where the online system is an online concierge system 102, the online concierge system 102 maintains an item embedding for each item offered by a warehouse 110 that communicates with the online concierge system 102. In another example where the online system provides content items to users, the online system maintains item embeddings for each content item maintained by the online system or accessible to the online system. Each item embedding is associated with an item identifier that uniquely identifies an item. An item embedding represents an item as a multidimensional vector in a latent space. In various embodiments, item embeddings and the embedding for the query have an equal number of dimensions. The online system may generate item embeddings using any suitable method. Examples of generation of item embeddings are described in U.S. patent application Ser. No. 17/514,177, filed on Oct. 29, 2021, U.S. patent application Ser. No. 17/534,184, filed on Nov. 23, 2021, each of which is hereby incorporated by reference in its entirety.

Figure 5:
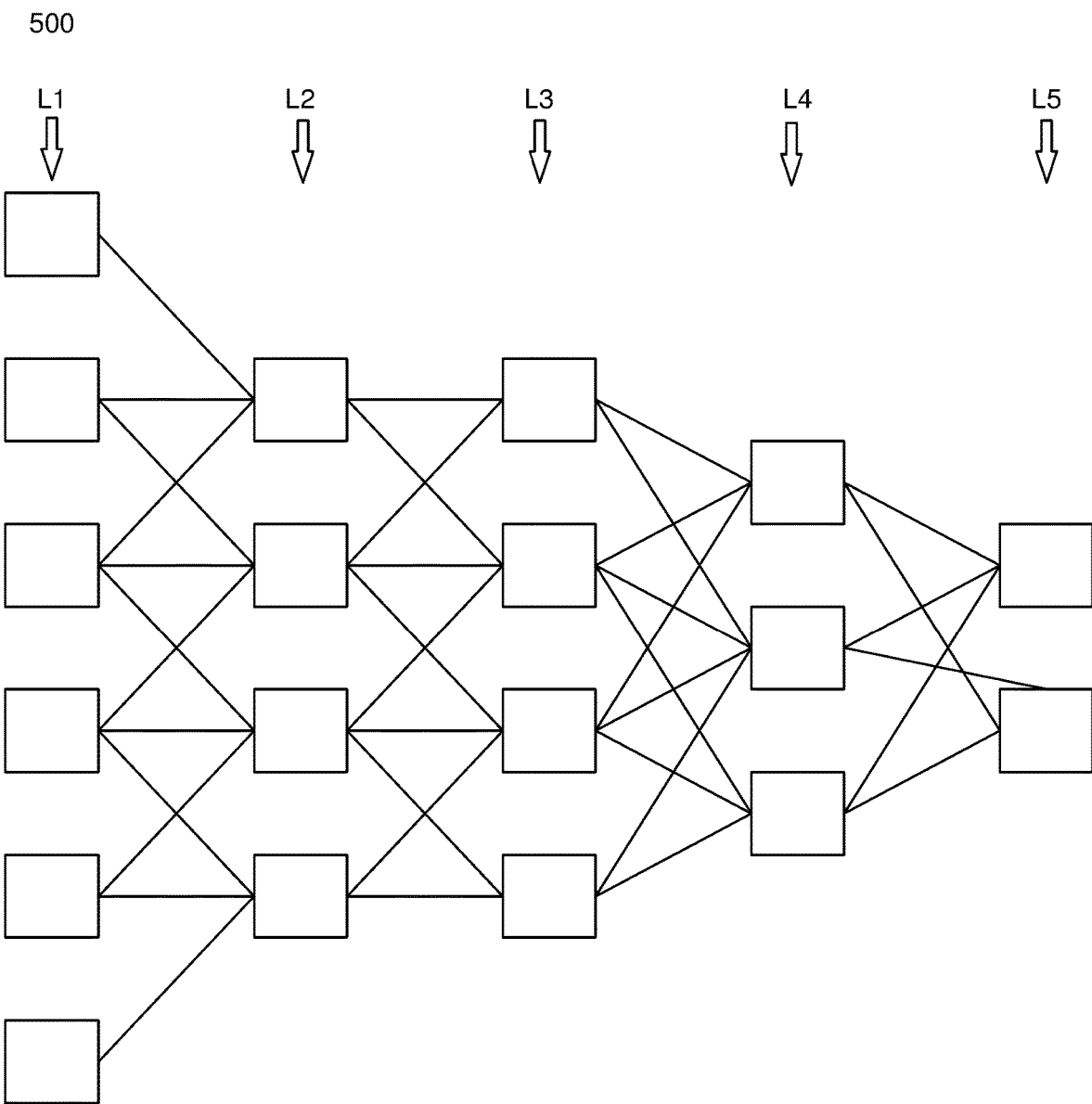
FIG. 5 is an example network model that may be used to generate an embedding for an item, according to one embodiment.

FIG. 5 shows an example network model 500 that may be used to generate an embedding for an item. The network model 400 shown in FIG. 5, also referred to as a deep neural network, comprises a plurality of layers (e.g., layers L1 through L5), with each of the layers including one or more nodes. Each node has an input and an output and is associated with a set of instructions corresponding to the computation performed by the node. The set of instructions corresponding to the nodes of the network may be executed by one or more computer processors.

Each connection between nodes in the network model 500 may be represented by a weight (e.g., numerical parameter determined through a training process). In some embodiments, the connection between two nodes in the network model 500 is a network characteristic. The weight of the connection may represent the strength of the connection. In some embodiments, connections between a node of one level in the network model 500 are limited to connections between the node in the level of the network model 500 and one or more nodes in another level that is adjacent to the level including the node. In some embodiments, network characteristics include the weights of the connection between nodes of the neural network. The network characteristics may be any values or parameters associated with connections of nodes of the neural network.

A first layer of the network model 500 (e.g., layer L1 in FIG. 5) may be referred to as an input layer, while a last layer (e.g., layer L5 in FIG. 0.5) may be referred to an output layer. The remaining layers (layers L2, L3, L4) of the network model 500 are referred to are hidden layers. Nodes of the input layer are correspondingly referred to as input nodes; nodes of the output layer are referred to as output nodes, and nodes of the hidden layers are referred to as hidden nodes. Nodes of a layer provide input to another layer and may receive input from another layer. For example, nodes of each hidden layer (L2, L3, L4) are associated with two layers (a previous layer and a next layer). A hidden layer (L2, L3, L4) receives an output of a previous layer as input and provides an output generated by the hidden layer as an input to a next layer. For example, nodes of hidden layer L3 receive input from the previous layer L2 and provide input to the next layer L4.

The layers of the network model 500 are configured to identify one or more item embeddings of an item identified to the network model 500. For example, an output of the last hidden layer of the network model 500 (e.g., the last layer before the output layer, illustrated in FIG. 5 as layer L4) indicates one or more item embeddings of an item. An item embedding may be a high-dimensional vector indicating features of the identified item to form a feature vector for the identified item.

In some embodiments, the weights between different nodes in the network model 500 may be updated using machine learning techniques. For example, the network model 500 may be provided with training data identifying items with a label applied to each identified user. The label applied to an item may be based on interactions with the item by users of an online system. In some embodiments, the training data comprises a set of feature vectors corresponding to a specific number or specific percentage of items offered by the online system, with each feature vector of the training data associated with a corresponding label applied to each identified item. The label applied to an item indicates whether a specific interaction was performed with the item in some embodiments. Features of an item of the training set determined by the network model 500 are compared to a difference of a probability of the specific interaction being performed with the item from the output layer of the network model and the label applied to the item of the training set, and the comparison is used to modify one or more weights between different nodes in the network model 500, modifying an embedding output by the network model 500 for the item.

Referring back to FIG. 4, the online system retrieves 410 item embeddings and selects 415 a set of items having item embeddings nearest to the vector for the query in the latent space. In various embodiments, the online system determines distances (e.g., Euclidean distances, Manhattan distances) between the embedding for the query and item embeddings and selects the set of items based on the determined distances. From the determined distances between the embedding for the query and item embeddings, the online system selects 415 a set of items corresponding to item embeddings having less than a threshold distance to the embedding for the query. Alternatively, the online system ranks items based on distances between their corresponding item embeddings and the embedding for the query and selects 415 the set of items as items having at least a threshold position in the ranking. The online system may use any suitable nearest neighbor process or approximate nearest neighbor process to select the set of items in various embodiments.

In some embodiments, the online system determines distances between the embedding for the query and each item embedding. In other embodiments, the online system retrieves a group of item embeddings based on the received query and determines a distance between the embedding for the query and each item embedding of the group. For example, the online system maintains different groups of item embeddings, where each item embedding in a group has a common characteristic; the online system determines a characteristic of the query from metadata included in the query and selects a group with a common characteristic of item embeddings matching the characteristic of the query and determines distances between the embedding for the query and item embeddings of the group.

The online system may use other methods to select 415 the set of items in some embodiments. For example, the online system selects 415 the set of items by determining a measure of similarity between the embedding for the query and an item embedding of an item. In some embodiments, the measure of similarity is a dot product of the embedding for the query and an item embedding of an item of the selected set. Alternatively, the measure of similarity is a cosine similarity between the embedding for the query and an item embedding of the item of the selected set. However, in other embodiments the online system may determine any suitable measure of similarity between the embedding for the query and an item embedding of an item of the selected set. In various embodiments, the online system ranks items based on the measure of similarity between item embeddings corresponding to the items and the embedding for the query and selects 415 the set of items as items having at least a threshold position in the ranking. Alternatively, the online system selects 415 the set of items as items with corresponding item embeddings having at least a threshold measure of similarity to the embedding for the query.

To remove items from the selected set that are less relevant to the received query, the online system identifies 420 a specific attribute for each item of the selected set. The specific attribute may be predetermined by the online system in some embodiments. Alternatively, the specific attribute may be identified by a user from whom the query is received. The online system maintains an item database, such as the inventory database 204 of the online concierge system 102 further described above in conjunction with FIG. 2. For example, the online system is an online concierge system 102 maintaining a taxonomy, as further described above in conjunction with FIG. 2, with the taxonomy identifying a category in association with each item, along with other information, and the online concierge system 102 identifies 420 a category stored in association with each item having an item embedding included in the selected set. Each item of the selected set has a value associated with the specific attribute by the online system and stored in conjunction with the item in an item database, and the online system retrieves 425 a value of the specific attribute for each item of the selected set. Referring back to the previous example where the specific attribute is a category associated with an item, the online concierge system 102 retrieves 425 a value of the category for each item of the selected set.

From the values of the specific attribute for each item of the selected set and the measure of similarity between the embedding for the query and item embeddings corresponding to items included in the selected set, the online system generates 430 a whitelist of values for the specific attribute from values of the specific attribute for items of the selected set. In one embodiment, the selected set of items is ranked based a measure of similarity to the embeddings for the query, and the online system identifies items of the selected set having at least a threshold position in the ranking. The online system generates 430 the whitelist of values as values of the selected attribute for the identified items. Alternatively, the online system identifies items in the selected set corresponding to item embeddings having a threshold measure of similarity relative to the embedding for the query and generates 430 the whitelist of values of the selected attribute as values of the selected attribute for items corresponding to the identified items. In some embodiments, the online system ranks items when selecting 415 the set of items based on distances between the embedding for the query and item embeddings for items or any other suitable value, and the online system generate 430 the whitelist of values as values of the specific attributes for items having at least a threshold position in the ranking of the set of items. In another example, the online system generates 430 the whitelist of values as values of the specific attribute for items with item embeddings having less than a threshold distance to the embedding for the query. In other embodiments, the online system identifies items both based on a ranking of the items and based on measures of similarity between the embedding for the query and a threshold measure of similarity to the embedding for the query. For example, the online system identifies items having at least the threshold position in the ranking and having at least the threshold measure of similarity to the embedding for the query. Subsequently, the online system generates 430 the whitelist of values as values of the selected attribute for the identified items.

Using the whitelist of values of the selected attribute, the online system modifies 435 the set of items by removing items that do not have a value of the selected attribute included in the whitelist of values from the selected set of items. To modify 435 the set of items, the online system retrieves a value for the specific attribute stored in association with each item of the selected set. In response to an item having a particular value for the specific attribute that is not included in the whitelist of values, the online system removes the item from the selected set of items to modify 435 set of items. Hence, the modified set of items includes items having values for the specific attribute matching at least one value in the group of the relevant values and does not include items that have values for the specific attribute that do not match at least one value in the whitelist of values. As the whitelist of values was generated from items with item embeddings having higher measures of similarity to the embedding for the query, the whitelist of values includes values for the specific attribute for items more similar to the received query. Hence, removing items from the selected set with values for the specific attribute that are not included in the whitelist of values results in the modified set of items including items with values for the specific attribute that correspond to values for the specific attribute for items with item embeddings that are more similar to the embedding for the query. The online system displays information describing items included in the modified set of items to the user from whom the query was received 405 in some embodiments, or the online system transmits the modified set of items to one or more additional processes that determine content for display to the user in response to the query.

Figure 6:
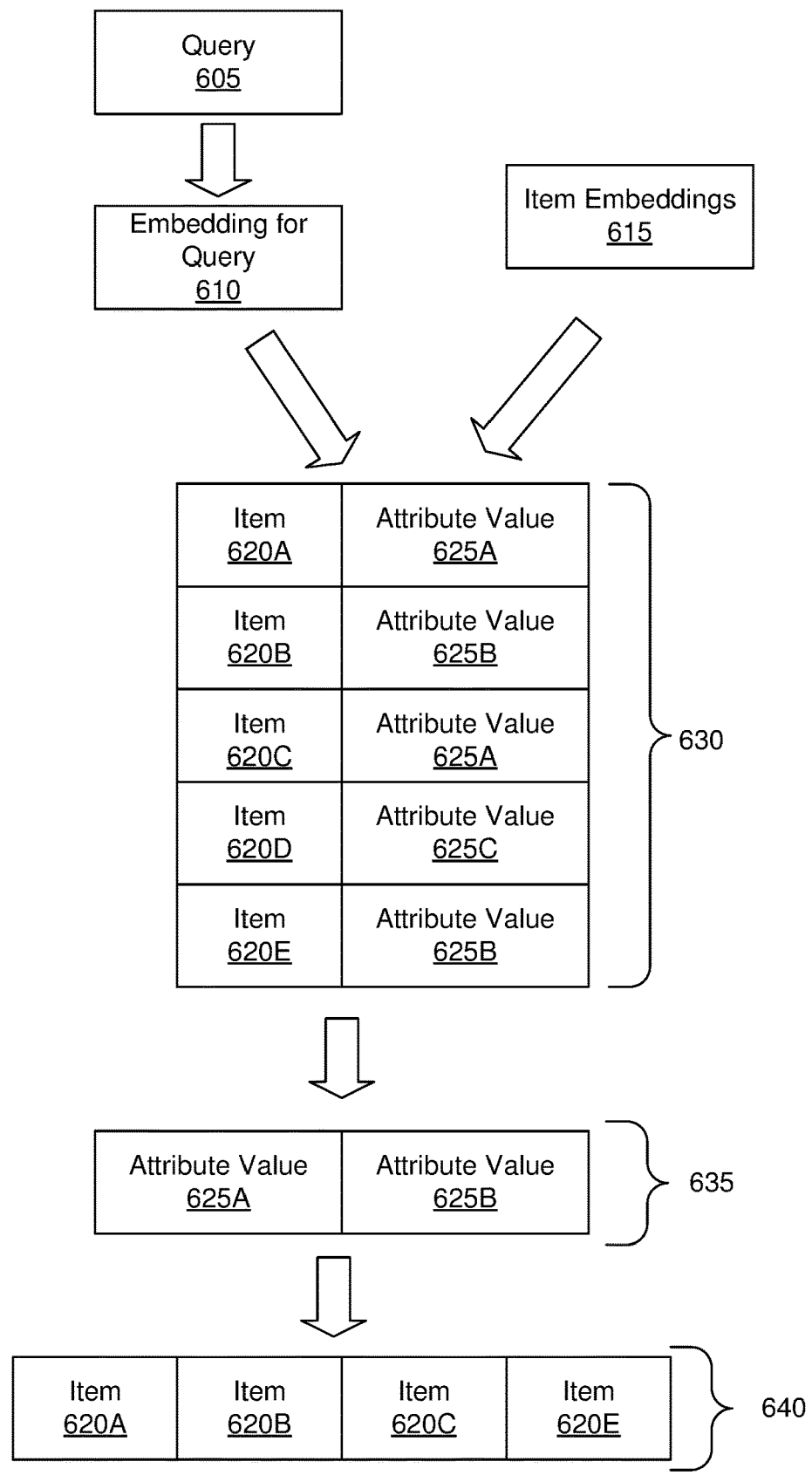
FIG. 6 is a process flow diagram of a method for retrieving items for a query using an embedding for the query, item embeddings, and one or more attributes of the items, according to one embodiment.

FIG. 6 is a process flow diagram of a method for retrieving items for a query using an embedding for the query, item embeddings, and one or more attributes of the items. In the example shown by FIG. 6, an online system receives a query 605 including one or more terms and generates an embedding 610 for the query, as further described above in conjunction with FIG. 4. As further described above in conjunction with FIGS. 4 and 5, the online system also maintains item embeddings 615 for items maintained or accessible by the online system. The online system selects a set 630 of items based on the embedding 610 for the query and the item embeddings 615 for various items, as further described above in conjunction with FIG. 4. For example, the set 630 of items includes items with item embeddings 615 having less than a threshold distance to the embedding 610 for the query or includes items with item embeddings 615 having at least a threshold position in a ranking based on distances between the embedding 610 for the query and the item embeddings 615. In the example of FIG. 6, the set 630 of items includes item 620A, item 620B, item 620C, item 620D, and item 620E.

Additionally, the online system identifies a specific attribute for items. As further described above in conjunction with FIGS. 2 and 4, the online system maintains one or more attributes for items and stores a value for each attribute in association with the item and the attribute in an item database. The specific attribute may be predetermined by the online system or may be selected by the online system based on one or more rules. In other embodiments, the specific attribute is specified by metadata included in the query 605. The online system may identify different specific attributes in different embodiments. The online system retrieves a value of the specific attribute for each item of the set 630. In the example of FIG. 6, item 620A, item 620B, item 620C, item 620D, and item 620E have attribute value 625A, attribute value 625B, attribute value 625A, attribute value 625C, and attribute value 625B, respectively, for the specific attribute.

As further described above in conjunction with FIG. 4, from values of the specific attribute for items of the set 630, the online system generates a whitelist 635 of values. In some embodiments, the online system identifies items of the set 630 having at least a threshold position in a ranking, such as a ranking based on measures of similarity between corresponding item embeddings 615 and the embedding 610 for the query, and generates the whitelist 635 of values as values of the specific attribute for at least one of the identified items. In other embodiments, the online system generates the whitelist 635 of values as values of the specific attribute of items having item embeddings 615 with at least a threshold measure of similarity to the embedding 610 for the query. In the example of FIG. 6, the online system identifies item 620A, item 620B, item 620C, and item 620E and generates the whitelist 635 of values from values of the specific attribute for item 620A, item 620B, item 620C, and item 620E. In the example of FIG. 6, the whitelist 635 of values includes attribute value 625A and attribute value 625B. Hence, the whitelist 635 of values includes values of the specific attribute for items of the set 630 with corresponding item embeddings 615 having higher measures of similarity to the embedding 610 for the query.

Based on the whitelist 635 of relevant values, the online system modifies the set 630 of items by removing items of the set 630 having values for the specific attribute that are not included in the whitelist 635 of values, resulting in a modified set 640 of items. In the example of FIG. 6, the online system removes item 620D, for which attribute value 625C is not included in the whitelist 635 of relevant values, from the set 630 to generate the modified set 640 of items. Hence, the online system leverages the specific attribute to remove items from the set 630 that have lower likelihoods of being relevant to the query 605 based on values of the specific attribute 630 for items with item embeddings 615 more similar to the embedding 610 for the query. The modified set 640 of items may be displayed to a user as results for the query 605 or may be provided to one or more processes that select results to display to the user in response to the query 605. For example, the online system generates an interface including results for the query that identifies the items included in the modified set 640 of items for transmission to a client device for display, simplifying user selection of one or more items. In particular, the user selection of one or more items may be simplified because the modified set 640 of items may be displayed, and the modified set 640 of items may have been modified such that items with lower likelihoods of being relevant to the query based on values of the specific attribute 630 for items have been removed. The results may be displayed in a customer mobile application 106 executing on a client device, such as the customer mobile application further described above in conjunction with FIG. 3A.

System Architecture

Figure 7:
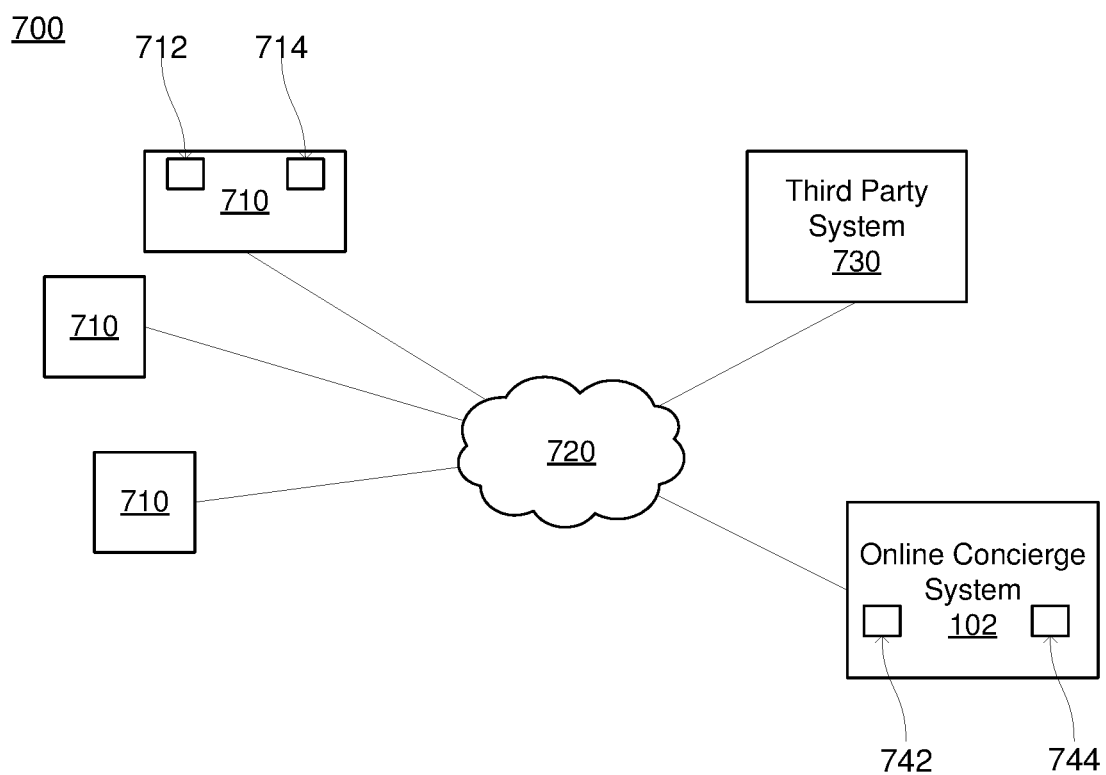
FIG. 7 is a block diagram of a system environment in which an online system, such an online concierge system, operates, according to one embodiment.

FIG. 7 is a block diagram of a system environment 700 in which an online system, such as the online concierge system 102 further described above in conjunction with FIGS. 1 and 2, operates. The system environment 700 shown by FIG. 7 comprises one or more client devices 710, a network 720, one or more third-party systems 730, and the online concierge system 102. In alternative configurations, different and/or additional components may be included in the system environment 700.

The client devices 710 are one or more computing devices capable of receiving user input as well as transmitting and/or receiving data via the network 720. In one embodiment, a client device 710 is a conventional computer system, such as a desktop or a laptop computer. Alternatively, a client device 710 may be a device having computer functionality, such as a personal digital assistant (PDA), a mobile telephone, a smartphone, or another suitable device. A client device 710 is configured to communicate via the network 720. In one embodiment, a client device 710 executes an application allowing a user of the client device 710 to interact with the online concierge system 102. For example, the client device 710 executes a customer mobile application 106 or a shopper mobile application 112, as further described above in conjunction with FIGS. 3A and 3B, respectively, to enable interaction between the client device 710 and the online concierge system 102. As another example, a client device 710 executes a browser application to enable interaction between the client device 710 and the online concierge system 102 via the network 720. In another embodiment, a client device 710 interacts with the online concierge system 102 through an application programming interface (API) running on a native operating system of the client device 710, such as IOS® or ANDROID™.

A client device 710 includes one or more processors 712 configured to control operation of the client device 710 by performing functions. In various embodiments, a client device 710 includes a memory 714 comprising a non-transitory storage medium on which instructions are encoded. The memory 714 may have instructions encoded thereon that, when executed by the processor 712, cause the processor to perform functions to execute the customer mobile application 106 or the shopper mobile application 112 to provide the functions further described above in conjunction with FIGS. 3A and 3B, respectively.

The client devices 710 are configured to communicate via the network 720, which may comprise any combination of local area and/or wide area networks, using both wired and/or wireless communication systems. In one embodiment, the network 720 uses standard communications technologies and/or protocols. For example, the network 720 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 620 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 620 may be represented using any suitable format, such as hypertext markup language (HTML) or extensible markup language (XML). In some embodiments, all or some of the communication links of the network 720 may be encrypted using any suitable technique or techniques.

One or more third party systems 730 may be coupled to the network 720 for communicating with the online concierge system 102 or with the one or more client devices 710. In one embodiment, a third party system 730 is an application provider communicating information describing applications for execution by a client device 710 or communicating data to client devices 710 for use by an application executing on the client device. In other embodiments, a third party system 730 provides content or other information for presentation via a client device 710. For example, the third party system 730 stores one or more web pages and transmits the web pages to a client device 710 or to the online concierge system 102. The third party system 730 may also communicate information to the online concierge system 102, such as advertisements, content, or information about an application provided by the third party system 730.

The online concierge system 102 includes one or more processors 742 configured to control operation of the online concierge system 102 by performing functions. In various embodiments, the online concierge system 102 includes a memory 744 comprising a non-transitory storage medium on which instructions are encoded. The memory 744 may have instructions encoded thereon corresponding to the modules further described above in conjunction with FIG. 2 that, when executed by the processor 742, cause the processor to perform the functionality further described above in conjunction with FIGS. 2 and 4-6. For example, the memory 744 has instructions encoded thereon that, when executed by the processor 742, cause the processor 742 to receive a query from a client device 710 or form a third party system 730, select a set of items satisfying the query based on an embedding for the query and item embeddings for items, generate a whitelist of values for a specific attribute of the items, and modify the set of items by removing items for which the online concierge system 102 having values for the specific attribute that are not included in the whitelist, as further described above in conjunction with FIGS. 4-6. Additionally, the online concierge system 102 includes a communication interface configured to connect the online concierge system 102 to one or more networks, such as network 720, or to otherwise communicate with devices (e.g., client devices 710) connected to the one or more networks.

One or more of a client device, a third party system 730, or the online concierge system 102 may be special purpose computing devices configured to perform specific functions, as further described above in conjunction with FIGS. 2-6, and may include specific computing components such as processors, memories, communication interfaces, and/or the like.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for improving a search interface using embeddings extracted from a neural network, the method comprising:
    receiving, at an online system, a query directed at the search interface;
    applying the neural network, by the online system, to extract an embedding for the query, the embedding for the query representing the query in a latent space of the neural network, wherein applying the neural network to extract the embedding for the query comprises:
        storing the query as a query feature vector,
        inputting the query feature vector into the neural network, and
        extracting a query latent vector in a first hidden layer of the neural network;
    applying the neural network to extract item embeddings for each of a plurality of items maintained in an item database by the online system, each item embedding corresponding to an item offered by the online system and representing the item in the latent space of the neural network, wherein applying the neural network to extract an item embedding for an item comprises:
        storing the item as an item feature vector,
        inputting the item feature vector into the neural network, and
        extracting an item latent vector in a second hidden layer of the neural network;
    comparing, in the latent space of the neural network, the embedding for the query to the item embeddings to select a set of items corresponding to item embeddings that are selected in the latent space;
    determining a value of a category associated with each item of the set of items from the item database;
    generating a whitelist of values for the category based on the values of the category associated with each item of the set; and
    generating, as a response to the query directed at the search interface that relies on the embeddings from the neural network, a query result comprising a plurality of items, wherein generating the plurality of items comprises removing one or more items having values for the category that are not included in the whitelist of values for the category.

2. The method of claim 1, wherein generating the whitelist of values for the category from the values of the category associated with each item of the set comprises:
    ranking items included in the set of items based on corresponding measures of similarity between the embedding for the query and the item embeddings corresponding to each item included in the selected set of items;
    identifying items of the selected set of items having at least a threshold position in the ranking; and
    generating the whitelist of values for the category as values of the category for the identified items.

3. The method of claim 1, wherein generating the whitelist of values for the category from the values of the category associated with each item of the selected set comprises:

identifying items of the set of items corresponding to item embeddings having at least a threshold measure of similarity to the embedding for the query; and generating the whitelist of values for the category as values of the category for the identified items.

4. The method of claim 1, wherein generating the whitelist of values for the category from the values of the category associated with each item of the selected set comprises:

ranking items included in the set of items based on corresponding measures of similarity between the embedding for the query and the item embeddings corresponding to each item included in the selected set of items; and generating the whitelist of values for the category as values of the category for items having at least a threshold position in the ranking and having item embeddings with at least a threshold measure of similarity to the embedding for the query.

5. The method of claim 1, wherein comparing, in the latent space of the neural network, the embedding for the query to the item embeddings comprises:

determining distances between the embedding for the query and each item embedding; and generating the set of items based on the determined distances.

6. The method of claim 1, further comprising:

generating an interface displaying items from a modified set of items with the one or more items removed from the online system as results satisfying the query for transmission from the online system to a client device for display.

7. The method of claim 1, wherein receiving, at the online system, a query directed at the search interface comprises:

receiving a request to create an order from a user, the request identifying a warehouse; and receiving the query to identify one or more items offered by the warehouse satisfying the query.

8. The method of claim 7, further comprising:

generating an interface displaying items of a modified set of items with the one or more items removed from the online system as results for the query for transmission to a client device for display via a customer mobile application executing on the client device.

9. A method for improving a search interface using embeddings extracted from a neural network, the method comprising:

receiving, at an online system, a query directed at the search interface;

applying the neural network, by the online system, to extract an embedding for the query, the embedding for the query representing the query in a latent space of the neural network, wherein applying the neural network to extract the embedding for the query comprises:

storing the query as a query feature vector, inputting the query feature vector into the neural network, and extracting a query latent vector in a first hidden layer of the neural network;

applying the neural network to extract item embeddings for each of a plurality of items maintained in an item database by the online system, each item embedding representing an item maintained by the online system in the latent space of the neural network, wherein applying the neural network to extract an item embedding for an item comprises:

storing the item as an item feature vector, inputting the item feature vector into the neural network, and extracting an item latent vector in a second hidden layer of the neural network;

comparing, in the latent space of the neural network, the embedding for the query to the item embeddings to select a set of items corresponding to item embeddings that are selected in the latent space;

identifying a specific attribute associated with items maintained by the online system;

determining a value of the specific attribute associated with each item of the selected set of items from the item database;

generating a whitelist of values for the specific attribute based on the values of the specific attribute associated with items of the selected set; and generating, as a response to the query directed at the search interface that relies on the embeddings from the neural network, a query result comprising a plurality of items, wherein generating the plurality of items comprises removing one or more items having particular values for the specific attribute that do not match at least one value included in the whitelist of values for the specific attribute.

10. The method of claim 9, wherein generating the whitelist of values for the specific attribute based on the values of the specific attribute associated items of the selected set comprises:

ranking items included in the selected set of items based on corresponding measures of similarity between the embedding for the query and the item embeddings corresponding to each item included in the selected set of items;

identifying items of the selected set of items having at least a threshold position in the ranking; and generating the whitelist of values for the specific attribute as values of the specific attribute for the identified items.

11. The method of claim 9, wherein generating the whitelist of values for the specific attribute based on the values of the specific attribute associated items of the selected set comprises:

identifying items of the set of items corresponding to item embeddings having at least a threshold measure of similarity to the embedding for the query; and generating the whitelist of values for the specific attribute as values of the specific attribute for the identified items.

12. The method of claim 9, wherein generating the whitelist of values for the specific attribute based on the values of the specific attribute associated items of the selected set comprises:

ranking items included in the set of items based on corresponding measures of similarity between the embedding for the query and the item embeddings corresponding to each item included in the selected set of items; and generating the whitelist of values for the specific attributes as values of the specific attribute for items having at least a threshold position in the ranking and having item embeddings with at least a threshold measure of similarity to the embedding for the query.

13. The method of claim 9, wherein comparing, in the latent space of the neural network, the embedding for the query to the item embeddings comprises:

determining distances between the embedding for the query and each item embedding; and generating the set of items based on the determined distances.

14. The method of claim 9, further comprising:
generating an interface displaying items from a modified set of items with the one or more items removed from the online system as results satisfying the query for transmission from the online system to a client device for display.

15. A computer program product comprising a non-transitory computer readable storage medium having instructions encoded thereon, the instructions for improving a search interface using embeddings extracted from a neural network, wherein the instructions, when executed by a processor, cause the processor to:
receive, at an online system, a query directed at the search interface;
apply the neural network, by the online system, to extract an embedding for the query, the embedding for the query representing the query in a latent space of the neural network, wherein applying the neural network to extract the embedding for the query comprises:
storing the query as a query feature vector,
inputting the query feature vector into the neural network, and
extracting a query latent vector in a first hidden layer of the neural network;
apply the neural network to extract item embeddings for each of a plurality of items maintained in an item database by the online system, each item embedding representing an item maintained by the online system in the latent space of the neural network, wherein applying the neural network to extract an item embedding for an item comprises:
storing the item as an item feature vector,
inputting the item feature vector into the neural network, and
extracting an item latent vector in a second hidden layer of the neural network;
compare, in the latent space of the neural network, the embedding for the query to the item embeddings to select a set of items corresponding to item embeddings that are selected in the latent space;
identify a specific attribute associated with items maintained by the online system;
determine a value of the specific attribute associated with each item of the selected set of items from the item database;
generate a whitelist of values for the specific attribute based on the values of the specific attribute associated with items of the selected set; and
generate, as a response to the query directed at the search interface that relies on the embeddings from the neural network, a query result comprising a plurality of items, wherein generating the plurality of items comprises removing one or more items having particular values for the specific attribute that do not match at least one value included in the whitelist of values for the specific attribute.

16. The computer program product of claim 15, wherein generate the whitelist of values for the specific attribute based on the values of the specific attribute associated items of the selected set comprises:
rank items included in the selected set of items based on corresponding measures of similarity between the embedding for the query and the item embeddings corresponding to each item included in the selected set of items;
identify items of the selected set of items having at least a threshold position in the ranking; and
generate the whitelist of values for the specific attribute as values of the specific attribute for the identified items.

17. The computer program product of claim 15, wherein generate the whitelist of values for the specific attribute based on the values of the specific attribute associated items of the selected set comprises:
identify items of the set of items corresponding to item embeddings having at least a threshold measure of similarity to the embedding for the query; and
generate the whitelist of values for the specific attribute as values of the specific attribute for the identified items.

18. The computer program product of claim 15, wherein generate the whitelist of values for the specific attribute based on the values of the specific attribute associated items of the selected set comprises:
rank items included in the set of items based on corresponding measures of similarity between the embedding for the query and the item embeddings corresponding to each item included in the selected set of items; and
generate the whitelist of values for the specific attributes as values of the specific attribute for items having at least a threshold position in the ranking and having item embeddings with at least a threshold measure of similarity to the embedding for the query.

19. The computer program product of claim 15, wherein compare, in the latent space of the neural network, the embedding for the query to the item embeddings comprises:
determine distances between the embedding for the query and each item embedding; and
generating the set of items based on the determined distances.

20. The method of claim 1, wherein the first hidden layer of the neural network is the second hidden layer of the neural network.

* * * * *